(12) United States Patent
Skocek et al.

(10) Patent No.: US 11,208,350 B2
(45) Date of Patent: Dec. 28, 2021

(54) METHOD FOR SIMULTANEOUS EXHAUST GAS CLEANING AND MANUFACTURING OF SUPPLEMENTARY CEMENTITIOUS MATERIAL

(71) Applicant: HConnect 2 GmbH, Heidelberg (DE)

(72) Inventors: Jan Skocek, Leimen (DE); Maciej Zajac, Heidelberg (DE); Mohsen Ben Haha, Heidelberg (DE); Gerd Bolte, Schriesheim (DE)

(73) Assignee: HConnect 2 GmbH, Heidelberg (DE)

( * ) Notice: Subject to any disclaimer, the term of this patent is extended or adjusted under 35 U.S.C. 154(b) by 71 days.

(21) Appl. No.: 16/768,201

(22) PCT Filed: Dec. 13, 2018

(86) PCT No.: PCT/EP2018/084823
§ 371 (c)(1),
(2) Date: May 29, 2020

(87) PCT Pub. No.: WO2019/115722
PCT Pub. Date: Jun. 20, 2019

(65) Prior Publication Data
US 2020/0290925 A1    Sep. 17, 2020

(30) Foreign Application Priority Data

Dec. 13, 2017 (EP) ..................................... 17207076
Jun. 11, 2018 (EP) ..................................... 18176964

(51) Int. Cl.

| | |
|---|---|
| C04B 18/16 | (2006.01) |
| C04B 20/00 | (2006.01) |
| C04B 20/02 | (2006.01) |
| C04B 28/04 | (2006.01) |
| C04B 111/00 | (2006.01) |

(52) U.S. Cl.
CPC ........ C04B 18/167 (2013.01); C04B 20/0076 (2013.01); C04B 20/023 (2013.01); C04B 20/026 (2013.01); C04B 28/04 (2013.01); C04B 2111/00241 (2013.01)

(58) Field of Classification Search
CPC . C04B 18/167; C04B 20/0076; C04B 20/023; C04B 20/026; C04B 28/04; C04B 2111/00241
See application file for complete search history.

(56) References Cited

U.S. PATENT DOCUMENTS

| | | |
|---|---|---|
| 5,725,655 A | 3/1998 | Catterton et al. |
| 6,936,098 B2 | 8/2005 | Ronin |
| 9,664,446 B2 | 5/2017 | Achenbach |
| 10,029,951 B2 | 7/2018 | Juilland et al. |
| 10,343,199 B2 | 7/2019 | Hills et al. |

FOREIGN PATENT DOCUMENTS

| | | |
|---|---|---|
| CN | 101343155 A | 1/2009 |
| CN | 103347838 A | 10/2013 |
| CN | 104556882 A | 4/2015 |
| CN | 105800971 A | 7/2016 |
| CN | 106431116 A | 2/2017 |
| EP | 2628718 A1 | 8/2013 |
| JP | 05238790 A | 9/1993 |
| KR | 101777142 B1 | 9/2017 |
| WO | 2004041746 A1 | 5/2004 |
| WO | 2007096671 A1 | 8/2007 |
| WO | 2014040852 A1 | 3/2014 |
| WO | 2014154741 A1 | 10/2014 |

OTHER PUBLICATIONS

International Search Report issued in PCT/EP2018/084823 dated Feb. 18, 2019.
International Preliminary Report on Patentability issued in PCT/EP2018/084823 dated Nov. 14, 2019.
Partial European Search Report dated Nov. 15, 2018 issued in the corresponding EP 18 17 6964.
Florea M.V.A., Brouwers H.J.H., "Recycled concrete fines and aggregates—the composition of various size fractions related to crushing history", https://josbrouwers.bwk.tue.nl/ publications/Conference92.pdf, pp. 1-8.
W.J.J. Huijgen et al., "Mineral CO2 sequestration by steel slag carbonation", Environ. Sci. Technol. 2005, 39, 9676-9682, pp. 1-9.
Shu-Yuan Pan et al., "CO2 Capture by accelerated carbonation of alkaline wastes: a review on its principles and applications", Aerosol and Air Quality Research 2012, 12, pp. 770-791.
Kaithwas et al., "Industrial wastes derived solid adsorbents for CO2 capture: A mini review", Chemical Engineering Research and Design 2012, 90, pp. 1632-1641.
Engelsen et al. "Carbon Dioxide Uptake in Demolished and Crushed Concrete", BYGGFORSK Norwegian Building Research Institute, Project report 395, Oslo 2005, pp. 1-36.
B. Lagerblad "Carbon Dioxide Uptake During Concrete Life Cycle: State of the Art", Tech. Rep. Swedish Cement and Concrete Research Institute, 2005, pp. 1-47.

(Continued)

*Primary Examiner* — Anthony J Green
(74) *Attorney, Agent, or Firm* — Collard & Roe, P.C.

(57) ABSTRACT

A method for manufacturing a binder of a hydratable material includes providing a starting material from one or more raw materials convertible by tempering at 600 to 1200° C. into the hydratable material and tempering the starting material to provide the hydratable material containing not more than 10% by weight monocalcium silicate and at least 15% by weight hydratable phases in the form of lime and dicalcium silicate. The residence time and the tempering temperature are adapted to obtain the hydratable material by converting not more than 80% by weight of the starting material, and the hydratable material is then cooled to provide the binder comprising the hydratable material. The binder can be mixed with water and optionally one or more of aggregate, additives, admixtures to obtain a binder paste that is placed, hydrated and carbonated to produce a building product.

20 Claims, 4 Drawing Sheets

(56) References Cited

OTHER PUBLICATIONS

Chinese Search Report/Office Action dated Aug. 10, 2021 issued in the corresponding Chinese Application Serial No. 201880080395.7 (with English translation of relevant parts).

METHOD FOR SIMULTANEOUS EXHAUST GAS CLEANING AND MANUFACTURING OF SUPPLEMENTARY CEMENTITIOUS MATERIAL

CROSS REFERENCE TO RELATED APPLICATIONS

This application is the National Stage of PCT/EP2018/084823 filed on Dec. 13, 2018, which claims priority under 35 U.S.C. § 119 of European Application No. 17207076.5 filed on Dec. 13, 2017 and European Application No. 18176964.7 filed on Jun. 11, 2018, the disclosures of which are incorporated by reference. The international application under PCT article 21(2) was published in English.

BACKGROUND OF THE INVENTION

The present invention relates to a method for cleaning an exhaust gas from $CO_2$ with simultaneous manufacturing of a supplementary cementitious material from recycled concrete fines and to the use of a stockpile or silo containing recycled concrete fines for exhaust gas cleaning from $CO_2$ and/or $SO_x$ with x from 0 to 3.

Cement is a widely used and versatile building material. However, the manufacturing of the most common cement, Portland cement, consumes considerable amounts of mineral raw materials and energy (fuel). Thus, there is a long and partly very successful history of replacing the valuable natural resources mineral raw material and fuels like coal by waste, of substituting cement with supplementary cementitious material (SCM) and finding alternative cements. Currently, the most used SCMs are the latent-hydraulic or pozzolanic materials granulated blast-furnace slag (GBFS) and coal fly ashes (FA) respectively. The quantities of these materials characterized by adequate quality are limited globally to only about 20% of cement production and are unlikely to increase. Application of the mineral addition limestone is limited because of little contribution of this material to the performance. Nonetheless, there is still a need for finding even more efficient means to save energy and natural resources.

Unluckily, the production of the cement is associated with significant $CO_2$ emissions. It is said that the production of one ton of Portland cement clinker creates approximately one ton of $CO_2$. Approximately half of the $CO_2$ emissions from cement production stem from the calcination of limestone, i.e. the process where limestone is burnt and $CO_2$ gas is released to the atmosphere. Since the demand for building materials and particularly for cement is increasing, the $CO_2$ emissions would further increase contributing negatively to the climate changes, under business-as-usual. The cement industry has already reached significant reductions in the $CO_2$ emissions associated with cement production. This is done over the increased energy efficiency, use of alternative fuels including a wide range of wastes and through clinker substitution by supplementary cementitious materials. These efforts need to be further followed to cope with the increasing demand for the cement. Particularly the rate of SCMs use as partial replacements for Portland cement clinker needs to be increased.

Further, an increasing amount of concrete structures is being replaced resulting in a huge amount of demolished concrete that has found only limited use so far. According to U.S. Pat. No. 5,725,655 A and M. V. A. Florea and H. J. H. Brouwers, "Recycled concrete fines and aggregates—the composition of various size fractions related to crushing history", available at https://josbrouwers.bwk.tue.nl/publications/Conference92.pdf, recycled concrete fines (RCF in the following) ground to proper particle size can be useful aggregate. WO 2007/096671 A1 and WO 2014/040852 A1 improve on this art. WO 2007/096671 A1 suggests to bind together too fine RCF by tumbling and carbonation. WO 2014/040852 A1 proposes to more completely separate the aggregate in RCF from the hardened cement paste by grinding RCF in the presence of carbon dioxide. Thereby, the hardened cement paste carbonates and separates from the aggregate. The carbonated hardened cement paste is proposed to be calcined to provide a binder. However, a calcination results in $CO_2$ emissions increasing the $CO_2$ footprint of the final building material. WO 2014/154741 A1 describes a similar approach of grinding in the presence of $CO_2$ and mentions a use as "filler and/or supplementary cementitious material in binder" for the fines. From the tests made it is not clear, whether the fines are deemed reactive.

Still further proposals rely on using RCF in composite binders. Since RCF as such has not enough latent hydraulic or pozzolanic reactivity it is described to grind it together with cement for activation. WO 2004/041746 A1 reports improved reactivity when RCF is first ground separately from the cement and then subjected to a second grinding together with at least 20% of the cement. According to WO 2013/017391 A1 any material containing at least 15% calcium silicate hydrate is said to provide a "rapid binder" when ground together with cement. The material can be RCF and is used in an amount of 0.1 to 5% of the cement. This small amount used is a result of the unfavourable physical characteristics of such materials, namely their high surface area resulting from the C—S—H presence, impairing the workability of concrete made from the cement.

Although these proposals allow beneficial use of RCF it is an ongoing object to provide alternative or preferably more beneficial uses.

Further, emissions of sulphur oxides ($SO_x$) are also inherent in the cement manufacturing process. The presence of sulphur-based compounds in the raw materials has a great impact on the cement industry, owing to the large amount of limestone used in the process, especially when the deposits have a high content of pyrite ($FeS_2$). $SO_x$ is also generated from the burning of sulphur from the fuel used in the kiln or from waste typically burned in cement plants which can contain organic sulphur compounds. However, the allowed amounts of $SO_x$ emissions are limited. The inhalation of such substances entails risks to human health, and their interaction with the atmosphere results in the formation of sulfuric acid causing acid rain.

Since the basic chemistry cannot be changed, the industry tries to find other ways to reduce the $CO_2$ and $SO_x$ output. The easiest solution to limit this environmental $CO_2$ footprint is to produce composite cements. Unfortunately the increase of the proportion of the composite cements in the product portfolio is limited by the availability of high quality SCMs, i.e. reactive materials resulting in appreciable strength development.

Carbon capture and storage (CCS) technologies have also been developed to mitigate the $CO_2$ emission from cement plants or coal fired power plants. However, these technologies did not reach technology development allowing for the full scale application. Additionally these technologies are cost intensive.

Other proposals concern a use of solid materials to bind $CO_2$ and store it bound to the material. Wouter et al., "Mineral $CO_2$ sequestration by steel slag carbonation", Environ. Sci. Technol. 2005, 39, 9676-9682 describes contacting ground slag with dissolved $CO_2$. Pan et al., "$CO_2$ Capture by accelerated carbonation of alkaline wastes: a review on its principles and applications", Aerosol and Air Quality Research 2012, 12, 770-791, likewise concludes that carbonation of solid wastes in waste water is the most attractive route. Kaithwas et al., "Industrial wastes derived solid adsorbents for $CO_2$ capture: A mini review", Chem. Engin. Research and Design 2012, 90, 1632-1641 recommends surface treated mesoporous silica derived from fly ash as optimum adsorbent.

Natural carbonation of cement-based materials is a potential way to reduce the carbon footprint related to cement manufacturing process and use. Carbonation takes place during service life and after demolition when crushed concrete pieces are exposed to the atmosphere during a stockpiling period. Theoretically, due to the instability of hydration compounds in the presence of $CO_2$ (even in the case of the very low 0.04% $CO_2$ concentration which prevails in the atmosphere) concrete is able to absorb over time almost the same amount of $CO_2$ as that initially chemically released during the calcite calcination in the cement kiln.

$CO_2$ reabsorption by carbonation is particularly relevant for recycled concrete aggregates (RCA) taken from demolition sites of concrete building and infrastructure. During concrete recycling, concrete is crushed and the smaller particle size accelerates the carbonation. After extraction of coarse recycled aggregates, the remaining fines are characterized by a quite high reacted cement content (a high amount of $CO_2$ can thus be absorbed). A similar approach can be used for other Ca- or Mg-rich waste material (e.g. fly ashes, slag etc.). Using natural carbonation to capture $CO_2$ in these materials, and particularly in recycled concrete fines (RCF), has already been proposed in recent studies, see e.g. Engelsen et al. "Carbon Dioxide Uptake in Demolished and Crushed Concrete", BYGGFORSK Norwegian Building Research Institute, Project report 395, Oslo 2005 and B. Lagerblad "Carbon Dioxide Uptake During Concrete Life Cycle: State of the Art", Tech. Rep. Swedish Cement and Concrete Research Institute, 2005. However, the carbonation of the stock pile concrete using air is a very long process, taking hundreds of years. Thus, it is no useful $CO_2$ removal process.

Also, techniques for removal of $SO_x$ emissions from the cement industry have been suggested. These techniques fall into three broad categories: inherent removal by the process, process alterations, and $SO_x$ scrubbing technologies. Process alterations reduce the amount of $SO_x$ generated while scrubber technologies capture $SO_x$ after it has been generated. Some kiln systems can potentially reduce the amount of $SO_x$ generated through the use of process alterations, such as equipment changes, alterations to operating procedures, and/or raw material or fuel changes. Scrubber technologies that capture $SO_x$ after it has been generated in the kiln system can be divided into four classes: dry reagent injection, hot meal injection, lime/limestone spray dryer absorber, and wet scrubbers. The overall sulphur capture efficiency is dependent on the type of absorbent injected, temperature of the injection zone, fineness of the absorbent, and residence time. An example of a dry reagent system is the addition of calcium hydroxide ($Ca(OH)_2$) to the kiln feed or its injection in the riser duct between the two upper cyclones of a preheater. A hot meal injection system uses calcined material from the kiln system as a source of lime (CaO) for the absorption of $SO_x$. A lime/limestone spray dryer system injects a slurry of lime or limestone into the conditioning tower of the preheater. However, equipment changes and operating alterations are cost intensive. Replacing one raw material with another raw material may not be economically feasible and increasing alkali input for reducing the sulphur may not be possible because of product quality limits on total alkali concentration in the cement.

SUMMARY OF THE INVENTION

There remains a need for development of a cost-effective process to reduce the $CO_2$ footprint and/or $SO_x$ emission of cement manufacturing. Furthermore, there is an ongoing need for cost saving, easy, and effective exhaust gas cleaning, especially in respect of carbon dioxide and sulphur oxides.

Surprisingly it has now been found that carbonated RCF are a reactive and useful supplementary cementitious material and can replace a considerable amount of cement in composite binders. At the same time RCF are able to absorb significant amounts of $CO_2$ and $SO_x$ from exhaust gases, in particular from exhaust gases emitted by cement plants and coal fired power plants. RCF stockpiles equipped with suitable gas introduction systems provide a significant potential for $CO_2$ and $SO_x$ sequestration from exhaust gases.

Thus, the above mentioned problems are solved by a method for exhaust gas cleaning from $CO_2$ and simultaneous manufacturing of a supplementary cementitious material wherein recycled concrete fines with $d_{90} \leq 1000$ μm are provided in a stockpile or silo as starting material, flushing the starting material with the exhaust gas to provide a carbonated material, withdrawing the carbonated material and cleaned exhaust gas, and de-agglomerating the carbonated material to obtain the supplementary cementitious material. The problems are further solved by using a stockpile or silo containing recycled concrete fines with $d_{90} \leq 1000$ μm for exhaust gas cleaning with simultaneous conversion of the recycled concrete fines into a supplementary cementitious material.

Thus, it has unexpectedly been found that carbonation and/or sulphurization of recycled concrete fines in a stockpile or silo affords an improved process for cleaning exhaust gases containing $CO_2$ and/or $SO_x$. In particular the technology costs can be reduced, since simplicity of the method and device allows low investment costs. Furthermore, the present invention enables valorization of waste materials into added value products and provides an opportunity to secure new resources for composite cement production by valorization of RCF. In contrast to known proposals of carbon dioxide storage on waste materials the resulting carbonated material has a use and value in itself instead of needing to be stored.

The term supplementary cementitious material (abbreviated SCM) is defined herein as materials that have pozzolanic reactivity or latent hydraulic reactivity or both, designated SCM reactivity in the following. One of the possibilities to demonstrate the SCM reactivity is to replace a part of cement by the reactive SCM creating a binder and to compare the strength of such binder with that of binder containing the same amount of non-reactive material. The strength of the SCM-containing binder is appreciably higher than that of the binder with non-reactive material. Hence, SCM does not include mineral additions without SCM reactivity (at least not with an appreciable degree of SCM reactivity) like limestone.

Further, to simplify the description the usual cement chemist notation for oxides: H—$H_2O$, C—CaO, A-$Al_2O_3$, F—$Fe_2O_3$, M-MgO, S—$SiO_2$ and $-SO_3$ is used. Also, compounds are mostly named by the pure form, without explicit mentioning of solid solutions, foreign ion substitution and impurities etc. as are usual in technical and industrial materials. As one of ordinary skill in the art knows, the exact composition of phases may vary due to substitution with foreign ions. Such compounds are comprised when mentioning the pure form herein unless it is expressly stated otherwise.

Cement designates a material that, after mixing with an aqueous liquid to form a paste, is able to develop mechanical strength by hydraulic reaction. Thus, cement mostly denotes a clinker ground with or without further components, but also mixtures like super sulphated cement, geopolymer binder, and hydraulic materials not obtained by sintering like dicalcium silicate obtained by hydrothermal treatment. Composite binder or binder mixture means a mixture containing cement and a supplementary cementitious material. A binder is usually used adding water or another liquid and mostly also aggregate. Typically, admixtures and/or additives are added to the binder and/or the paste.

According to the invention recycled concrete fines, which are waste materials rich in carbonatable Ca and/or Mg phases are used for cleaning the exhaust gas. Rich in carbonatable Ca and/or Mg phases means that at least 12.5 wt.-% of the waste material calculated as oxides is CaO and/or MgO and at least 80 wt.-% of the CaO and MgO is in carbonatable phases before carbonation. Preferably, CaO and/or MgO constitute at least 20 wt.-%, more preferably at least 30 wt.-% and most preferred at least 50 wt.-% of the waste material. Preferably, at least 85 wt.-%, more preferably at least 90 wt.-% of the CaO and MgO are in carbonatable phases. Thus, while a part of the carbonatable CaO and MgO in the waste material might be already carbonated before carbonation, at least 10 wt.-% of the material calculated as oxides is carbonatable but not yet carbonated CaO and/or MgO. Concurrently, the fines resulting from concrete demolishing are converted into supplementary cementitious material after separation of particles reusable as aggregate.

The exact composition and particle size distribution of RCF depends on the original binder and composition used in the concrete and on the demolishing and grinding procedures applied. Usually, the original aggregate is separated as much as possible and the RCF contain mostly the ground hardened binder paste together with fine sand/aggregates, usually in amounts of 30 to 80 wt.-% of the total material weight.

The use of such RCF in cement and concrete manufacturing is challenging due to inappropriate properties such as high water demand and low (next to no) SCM reactivity. However, carbonation can provide the needed SCM reactivity. Concrete and other cement-based materials undergo a natural carbonation. For structures, the process is slow and only a surface layer is carbonated, see e.g. Hills et al, Statistical analysis of the carbonation rate of concrete, abstract found at http://www.sciencedirect.com/science/article/pii/S0008884615000496?via%3Dihub. The average carbonation rate of 1999 cases was 4.078 mm/year$^{0.5}$ implying that after e.g. 50 years of service life, the average carbonation depth will be lower than 29 mm. Hence, most of the concrete remains non-carbonated. During recycling, the concrete is crushed into smaller particles that, upon exposure to ambient atmosphere, carbonate readily to a certain extent but by far not enough for the use as SCM according to the invention. This carbonation is also designated natural carbonation herein. Typically, the carbonation during concrete recycling can be simulated by exposing fresh hardened concrete to an atmosphere with 0.04 Vol.-% $CO_2$ at 65% relative humidity (RH) for one week, providing the material is finely ground, i.e. below 200 μm. Compared to a natural carbonation defined like this the carbonated RCF used as SCM according to the invention contains at least 1.25 times, preferably 1.5 times, most preferred 1.75 times more $CO_2$ than is bound by natural carbonation. Typically, the SCM contains calcium carbonate with at least 30 wt.-% of the calcium carbonate being other polymorphs than calcite, contrary to the natural carbonation where calcite is the dominant calcium carbonate polymorph formed The reactivity index of the carbonated RCF, i.e. the SCM according to the invention, is at least 1.1 times, preferably 1.2 times, most preferred 1.3 times, that of limestone (LL according to EN 197-1) at the same replacement level of 30% of CEM I 32.5 R according to EN 197-1, at 28 days, in mortar. The reactivity index is defined as the ratio of the EN 196-1 mortar strength of the SCM-containing composite binder over the strength of a limestone-containing composite binder.

Thus, the SCM according to the invention is suitable to make composite binders analogously to known SCMs such as ground granulated blast furnace slag, fly ash and oil shale. If the fineness after carbonation is not as desired, i.e. comparable to that of the cement, appropriate fineness is achieved by grinding the SCM according to the invention and/or by co-grinding it with the cement. It is noted that contrary to the prior art using the RCF without carbonation as taught in the mentioned prior art a co-grinding is neither necessary nor preferred to obtain suitable SCM reactivity for the carbonated RCF.

The method according to the invention requires RCF in the form of suitably treated demolished concrete as starting material. Thus, after demolishing concrete building structures the coarse demolishing waste is crushed and ground in a manner known as such to provide recycled concrete fines that consist mostly of the ground binder paste. Usually, parts of the fine parts of the original aggregate are present. Original aggregate and non-concrete parts of the demolishing waste are separated by crushing, separation steps if needed (e.g. extracting metal with a magnet) and grinding.

The chemical and mineralogical composition in terms of oxides and phases of four typical RCF (which contain fine aggregates being mostly quartz) is as follows:

TABLE 1

|  | RCF 1 | RCF 2 | RCF 3 | RCF 4 |
| --- | --- | --- | --- | --- |
| chemical composition [wt.-%] | | | | |
| LOI | 17.98 | 21.59 | 12.23 | 7.89 |
| $SiO_2$ | 43.02 | 43.63 | 54.72 | 74.15 |
| $Al_2O_3$ | 6.38 | 5.70 | 6.32 | 3.64 |
| $Fe_2O_3$ | 3.02 | 2.74 | 2.36 | 1.43 |
| CaO | 24.39 | 21.51 | 18.29 | 10.44 |
| MgO | 1.39 | 1.22 | 1.81 | 0.90 |
| $K_2O$ | 0.80 | 0.76 | 1.00 | 0.77 |
| $Na_2O$ | 0.35 | 0.32 | 0.42 | 0.28 |
| $SO_3$ | 1.21 | 1.07 | 1.28 | 0.69 |
| mineralogical composition [wt-%] | | | | |
| Quartz | 28.3 | 28.7 | 39.1 | 58.4 |
| Calcite | 13.9 | 13.6 | 6.2 | 2.7 |
| Dolomite | 2.4 | 1.7 | — | — |

The particle size distribution determined by laser granulometry of RCF useful as starting material for conversion into SCM by carbonation usually conforms to a $D_{90} \leq 1000$ μm, preferably ≤500 μm, more preferred ≤200 μm and most preferred ≤100 μm with a Rosin-Rammler slope n from 0.5 or 0.6 to 1.4, preferably from 0.7 to 1.2. If the particles are coarser, they can be sieved and/or ground before or during carbonation to improve carbonation, i.e. ensure faster and more even carbonation. The starting material can also be mixed from different RCF to ensure a more homogenous composition or adjust the phase composition.

It is possible to include additional material into the starting material that accelerates the carbonation process and/or improves the final properties of the SCM. Preferably, substances for enhancing grinding or carbonating process or mixtures of two or more thereof are used as additional material. Typically, if present additional material will be included in an amount from 0.001 to 1 wt.-% with respect to the total starting material. Suitable materials include aqueous solvents like alkanolamines, for example primary amines like monoethanolamine (MEA) and diglycolamine (DGA), secondary amines like diethanolamine (DEA) and diisopropanolamine (DIPA), and tertiary amines like methyldiethanolamine (MDEA) and triethanolamine (TEA), or mixtures thereof, halogenides, ethylenedinitrilotetraaccetic acid (EDTA) or other substances that improve dissolution of $CO_2$ in the pore solution. Additionally enzymes such as carbonic anhydrase can be used to enhance carbonation efficiency and modify the properties of the reaction products. It is to be noted that these additions may have not only one action but can exercise a double role. They can e.g. modify the hydration process of the final binder as well as modify the carbonation process. The effect can largely depend on the dosage.

Moreover it is possible to add substances that regulate the pH during the carbonation process in order to enhance the precipitation of calcium carbonate. These include metal hydroxides and carbonates and similar substances.

Further, it is possible to add substances that modify the morphology of the precipitating calcium carbonate during the carbonation process. This provides the advantage of building less dense shales of hydrates-carbonates product and enables higher carbonation and hydration degrees. Suitable are for example magnesium salts, polyacrylic acid, polyacrylamide, polyvinyl alcohol, polyvinylsulfonic acids, styrenesulfonate, citric and other simple organic acids, polysaccharides and phosphonates, polycarboxylates.

Furthermore, it is possible to add admixtures that modify properties of the final composite binder and building material made from it. Often used admixtures are water reducing agents and plasticizers like for example, but not exclusively, organic compounds with one or more from carboxylate, sulfonate, phosphonate, phosphate or alcohol functional groups. These serve to achieve a good consistency, i.e. flowability, of the paste with a smaller amount of water. Since a decrease of w/b normally provides an increase of strength, such admixtures are commonly used. Air entraining agents are also able to improve flowability and can be used fore this aim or are need for other reasons such as, but not limited to, density modifications, compactibility improvements etc.

Other admixtures that influence workability are retarders. They mainly aim at prolonging the time that a specified consistency is maintained. Retarders slow the setting and/or hardening of the binder paste. Suitable substances are for example, but not exclusively, phosphates, borates, salts of Pb, Zn, Cu, As, Sb, lignosulphonates, hydroxycarboxylic acids and their salts, phosphonates, sugars (saccharides). It is also possible to add admixtures that are designed to modify the rheology properties to control the setting time, i.e. plasticizers and super-plasticizers. Those can have a retarding impact as well, e.g. lignosulphonates, polycarboxylic acids, etc.

All admixtures are used in the amounts known as such, wherein the amount is adapted to a specific binder and special needs in the known manner.

Additives can be added as well such as e.g. fillers, pigments, reinforcing elements, self-healing agents etc. All these can be added in the amounts known per se.

The starting material is subjected to carbonation as a first step of the method according to the invention. Therein, the starting material is placed inside a stockpile or silo and subjected to a carbonation atmosphere by flushing it with the exhaust gas to be cleaned. Useful contact times are achieved by flushing for 1 minute to 6 hours.

According to the invention, the flushing can be achieved e.g. by direct exposure to exhaust gas from a near-by cement plant or waste incineration or coal fired power plant. In particular the raw exhaust gases from the plants are cleaned, since the $CO_2$ and/or $SO_x$ concentration in them is high. This has the advantage that very little investment is needed since e.g. cement plant exhaust gas occurs in close proximity. Furthermore, the direct use of exhaust gases for carbonation and/or sulphurization of waste materials allows to increase the $CO_2$ and/or $SO_x$ sequestration level due to the high concentration of $CO_2$ and/or $SO_x$. Additionally, because the higher concentration of $CO_2$ and/or $SO_x$ used, more hydrates will be carbonated and/or sulphurized and therefore this allows to improve $CO_2$ and/or $SO_x$ storage in the waste materials. A typical exhaust gas from a rotary kiln for clinker manufacturing comprises: 14-33 Vol.-% $CO_2$ depending on the clinkering technology, used fuels and raw materials, see e.g. "Carbon dioxide Capture and Storage: Special Report of the intergovernmental panel on climate change", P. Metz, Cambridge University Press, 2005, p. 79. It can further comprise from 0.002 to 0.2 Vol.-% $SO_x$ in the raw gas, depending mainly on the raw materials and fuel used but also on process settings. In principle it is also possible to clean exhaust gas from remote sources. However, for gas transport, the gasses would need to be cleaned and concentrated. This is no problem technically but it is preferable above all for cost reasons to erect a new stockpile instead of transporting the exhaust gas.

The gases cleaned according to the invention can also be adjusted in humidity and/or temperature for drying or wetting of the stockpiled waste material to assure the maximum carbonation and/or sulphatation rate.

The raw exhaust gases can be also treated to increase $CO_2$ or $SO_x$ concentration. If carbonated RCF with low sulphur content is desired as by-product of the method, the exhaust gases can be also cleaned from sulphur.

The carbonation and/or sulphurization process rate increases with increasing temperature. Thus, the heat of the exhaust gases can be further used to accelerate the carbonation process. Preferably, the temperature is adjusted to range from 10 to 150° C., more preferably from 20 to 100° C. and most preferably to 40 to 80° C. But ambient temperature is also suitable and is preferably used when heating would be needed otherwise. The temperature will typically range from ambient to that of the exhaust gas as received, i.e. hot exhaust gas will not be purposefully cooled. Heating is possible but not preferred.

Another possibility to enhance reaction rate and rate of exhaust gas cleaning would be the use of increased pressure. However, usually the gain in rate is not able to outweigh the expenditure needed to allow increased pressure, so typically the flushing takes place at ambient pressure. If increased pressure is possible, 0.01 to 4 bar overpressure, preferably 0.1 to 2 bar overpressure are useful.

The carbonation and/or sulphurization can take place in a closed compartment, e.g. a storage hall originally designed for cement or a clinker silo with the pneumatic mixing arrangement originally designed for cement, raw meal or other raw materials used for cement production or for cement constituents. However, a stockpile is the easiest approach. The waste material can be piled e.g. with bulldozers or from a conveyor boom. It is possible but not necessary to provide side walls on one, two, three or all sides or forming a circle or U shape. The stockpile may need to be protected from rain and surface water to optimize the carbonation/sulphurization conditions.

A gas introduction system is arranged at the bottom of the stockpile or silo. The system comprises conduits for passing the exhaust gas to a number of distributors typically comprising several openings e.g. nozzles. The distributors are arranged at the bottom of the stockpile or silo evenly distributed over the whole bottom section and are designed to generate a homogeneous flow of the exhaust gas. Thereby a uniform distribution of exhaust gas and the contained $CO_2$ through the waste material can be achieved. The exhaust gas flows in vertical direction with respect to the stockpile.

In one preferred embodiment of the invention the RCF is placed into a silo and subjected to a carbonating and/or sulphating atmosphere by flushing the material in the silo with the exhaust gas which has higher $CO_2$ and/or $SO_x$ concentration than atmospheric concentration of $CO_2$ and/or $SO_x$. The method can further comprise a step of withdrawing the carbonated/sulphurized waste material, in particular the carbonated RCF, through a bottom discharge outlet.

The treated exhaust gas can be further captured and processed as done currently. Such processing includes processes such as e.g. dust removal, gas cooling, gas conditioning or using the gas for other technological purposes such as heat recovery or drying of wet materials.

In another embodiment exhaust gas from a cement plant operating in the so-called oxyfuel mode is used. In this manufacturing mode the kiln and optionally also the pre-calciner/heat exchanger are fed with oxygen instead of air to avoid formation of nitrogen oxides. The exhaust gas withdrawn from such plants is richer in $CO_2$. Thus, oxyfuel exhaust gas provides a very advantageous carbonation atmosphere, comparable to one obtained by enriching "normal" exhaust gas in $CO_2$.

The carbonated material obtained is de-agglomerated in a next step to form the supplemental cementitious material according to the invention. The paste fraction of the SCM obtained contains calcium carbonate and a mixture of amorphous phases comprising mainly transformed remnants of original hydrates, amorphous alumina and/or silica (gel), the silica and/or alumina being possibly partly hydrated. Preferably, not more than 70 wt-% of the calcium carbonate is formed as calcite. The SCM shows low water demand. Additionally, the SCM has high pozzolanic and/or latent hydraulic reactivity thereby providing synergies between calcium carbonate and alumina rich material when reacting in a cementitious matrix. This results in an appreciable evolution of compressive strength of a composite binder and allows a significant reduction of the clinker content of such binder.

As a rule, the SCM obtained by carbonation and de-agglomeration has a suitable fineness, since the particle size distribution of RCF used as starting material is fine enough. If the fineness of the SCM is not sufficient, or if an especially high fineness is desired, the SCM can be ground in known devices and in a known manner, either together or without other binder components, e.g. cement. Grinding aids can be added or may be present from grinding the demolished concrete. The reactivity of the supplemental cementitious material according to the invention allows its use in composite binders in an amount from 1 to 80 wt.-%, preferably from 5 to 50 wt.-%. Suitable cements are Portland cement (OPC), calcium sulfoaluminate cement (CSA), calcium aluminate cement (CAC) and other hydraulic cements including lime. The cement is usually present in an amount from 5 to 95 wt.-%, preferably 30 to 80 wt.-% in the binder. In addition, usual additives and/or admixtures can be used as described above for adding to the RCF. Naturally, the amounts of all components in a specific binder add up to 100%, so if SCM and cement are the sole components their amounts add up to 100%, when there are other components, the amount of SCM and cement is less than 100%.

Also, further SCMs like slag, fly ash and other main cement constituents according to EN 197-1 can be contained. Preferably, only the SCM according to the invention is contained since that is technically easier. Fly ash is often added to concrete, this is also possible for concrete from the composite binder according to the invention.

The fineness of the cement and SCM are adjusted to the intended use as known per se. Usually, the cement has a $D_{90} \leq 90$ µm, preferably 60 µm and a slope n from 0.6 to 1.4, preferably from 0.7 to 1.2, determined by laser granulometry and calculated by the Rosin-Rammler model.

The composite binder according to the invention is useful to applications known per se for cements according to EN 197-1 and other common hydraulic binders.

The invention will be illustrated further with reference to the example that follows, without restricting the scope to the specific embodiments described. The invention includes all combinations of described and especially of preferred features that do not exclude each other.

If not otherwise specified any amount in % or parts is by weight and in the case of doubt referring to the total weight of the composition/mixture concerned. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

BRIEF DESCRIPTION OF THE DRAWINGS

The invention will still further be illustrated with reference to the attached figures, without restricting the scope to the specific embodiments described. The invention includes all combinations of described and especially of preferred features that do not exclude each other.

DETAILED DESCRIPTION OF THE INVENTION

Example

Figure 1:
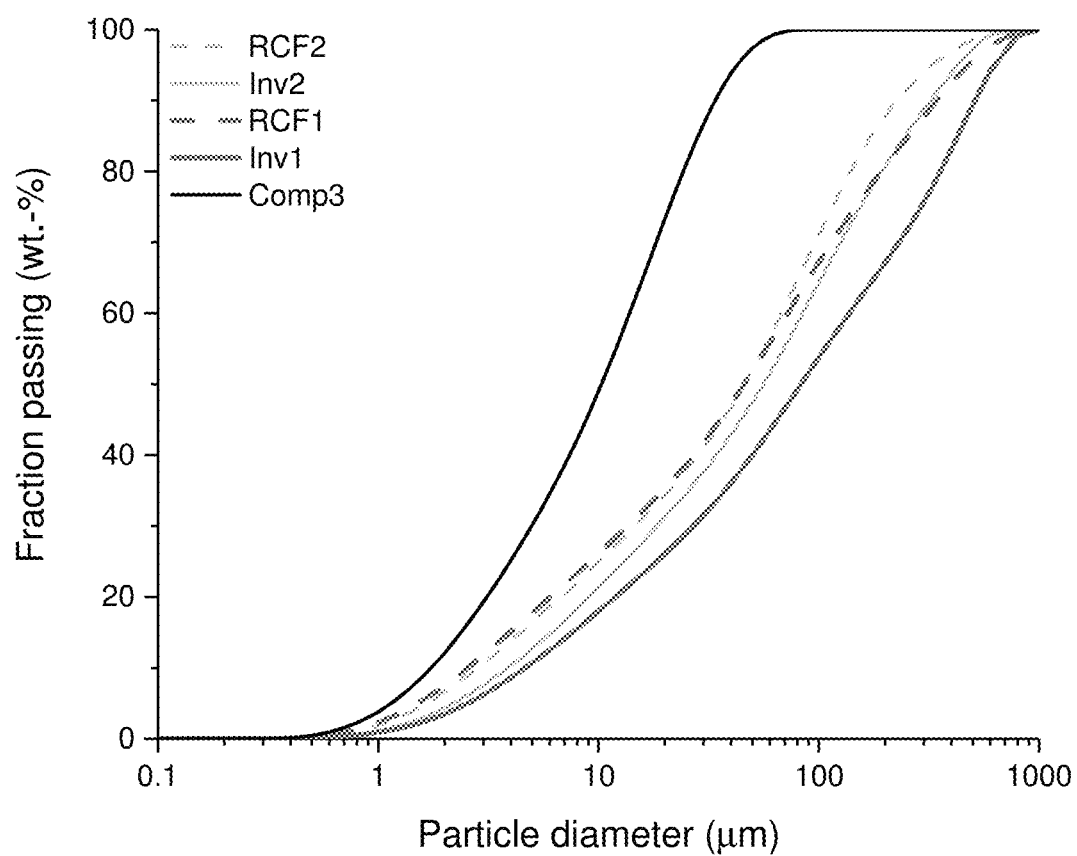
FIG. 1 is a table of particle size distributions from a ground hardened paste used to create the SCM according to the invention.

To simulate RCF a mortar CEM II/B-V containing 20 wt.-% fly ash and a mortar CEM III/A containing 50 wt.-% slag were hydrated at 60° C. for 1 month, crushed and ground. The obtained ground hardened paste had the particle size distributions shown in FIG. 1 and contained the following phases: aggregates from the concrete, unreacted cement phase and unreacted slag/fly ash particles, C—S—H phase, portlandite, AFt and AFm phases, iron bearing hydrates like hydrogarnets, iron hydroxide, goethite, magnesium bearing hydrates like hydrotalcite and brucite and minor phases as known per se. The chemical composition was typical for standard CEM II/B-V as defined in EN 196-1. This hardened paste is comparable to the real industrial RCF in the beginning of the recycling process, i.e. it is only little carbonated.

Natural carbonation was simulated by exposing the obtained ground hardened paste to an atmosphere with 0.04 Vol.-% $CO_2$ at 65% RH for one week, resulting in two RCF samples from the two used binders. These are also designated naturally carbonated RCF in the following and correspond to the typical RCF at the end of the recycling process, i.e. such that can be sampled from a storage pile for RCF.

According to the invention, the ground hardened paste samples were carbonated in a carbonation atmosphere containing 100 Vol.-% $CO_2$ at 2 bar above ambient pressure and at ambient temperature for 2 hours to obtain the SCM.

Thermogravimetry was used to determine the amount of bound $CO_2$. Samples of the ground hardened pastes, the RCFs, and the SCM according to the invention were heated between approximately 20 and 1050° C. The amount of bound $CO_2$ was calculated from the mass loss between 450° C. and 850° C. and normalized to the ignited cement paste mass. Table 3 presents the results.

TABLE 3

| sample from cement | ground hardened paste | RCF naturally carbonated | SCM according to invention |
|---|---|---|---|
| | bound $CO_2$ [g/100 g of ignited cement paste mass] | | |
| CEM II/B-V | 3 | 7 | 12 |
| CEM III/A | 3 | 11 | 22 |

The results demonstrate that during the time used the ground hardened paste samples simulating RCF could be successfully carbonated. For RCF1 from CEM II/B-V the bound $CO_2$ in the SCM was 1.7 times that of the sample after simulated natural carbonation, for RCF2 from CEM III/A it was 2.0 times that of the RCF.

Each RCF and SCM was blended with CEM I 32,5 R in a weight ratio 30:70 to obtain binder samples. Three further comparison binder samples were made by blending the same CEM I with 30% limestone (LL according to EN 197-1), 30% fly ash (V according to EN 197-1) and 20% limestone+ 10% fly ash, respectively. The samples are listed in the following table 4.

TABLE 4

| Sample contains 70% CEM I and | designation |
|---|---|
| 30% SCM acc. to invention | Inv1 |
| 30% naturally carbonated RCF | RCF1 |
| 30% fly ash | Comp3 |
| 30% limestone | Comp4 |
| 20% limestone + 10% fly ash | Comp5 |
| 30% SCM acc. to invention | Inv2 |
| 30% naturally carbonated RCF | RCF2 |

Figure 2:
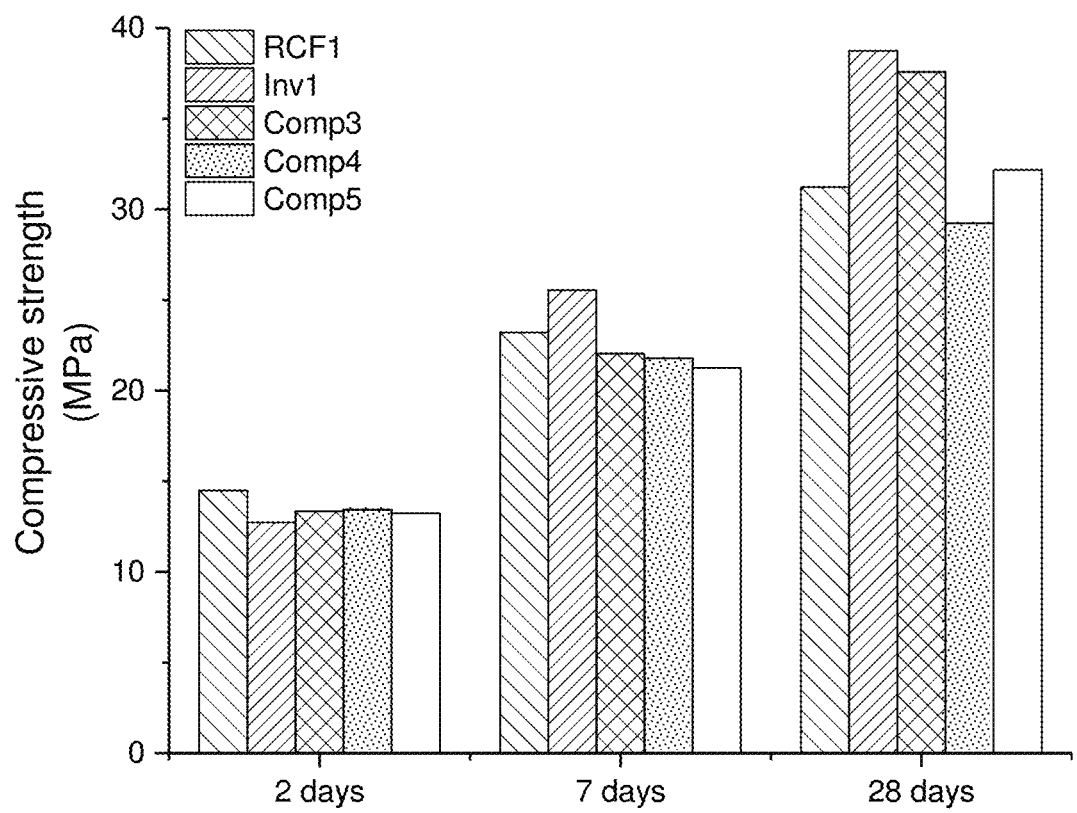
FIG. 2 shows a table of strength measurement results of samples prepared according to the invention.
Figure 3:
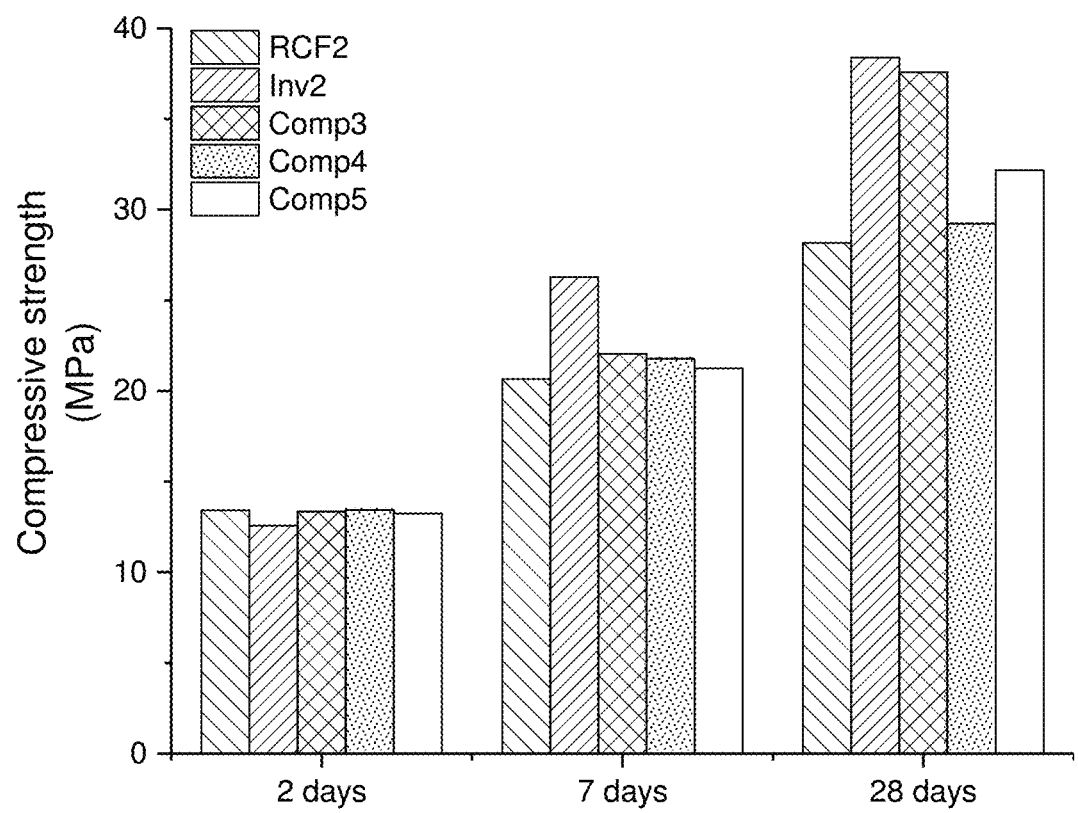
FIG. 3 shows further strength measurement results, FIG. 4 schematically shows an embodiment of the method according to the invention using a stockpile, and FIG. 5 schematically shows an embodiment of the method according to the invention using a silo.

Strength measurements were made with all samples according to DIN EN 196-1. The results are presented in FIGS. 2 and 3. FIG. 2 shows the SCM from CEM II/B-V compared to all comparison samples and FIG. 3 that of the SCM from CEM III/A. It is readily apparent that Inv1 and Inv2, the SCMs according to the invention, had a considerable SCM reactivity. Strength obtained was even higher than for Comp3, fly ash as SCM. In contrast, both RCF were much less reactive and not suitable as SCM.

Thus, the present invention allows to turn waste or recycled material into added value products, namely providing high reactivity SCM. The SCM according to the invention allows high clinker replacement and provides an opportunity to increase the composite binder production rate by providing a new source of reactive SCM. In addition, the method according to the invention provides a significant potential for $CO_2$ sequestration from exhaust gas, especially from cement plant exhaust gas. Since cement plant exhaust gas occurs in close proximity to where the SCM is needed for making composite binders the method needs very little investment. The carbonation device can be placed between the cement plant exhaust gas filter and its stack. It might even be beneficial to place it before the filter to achieve some filtering of the exhaust gas.

Figure 4:
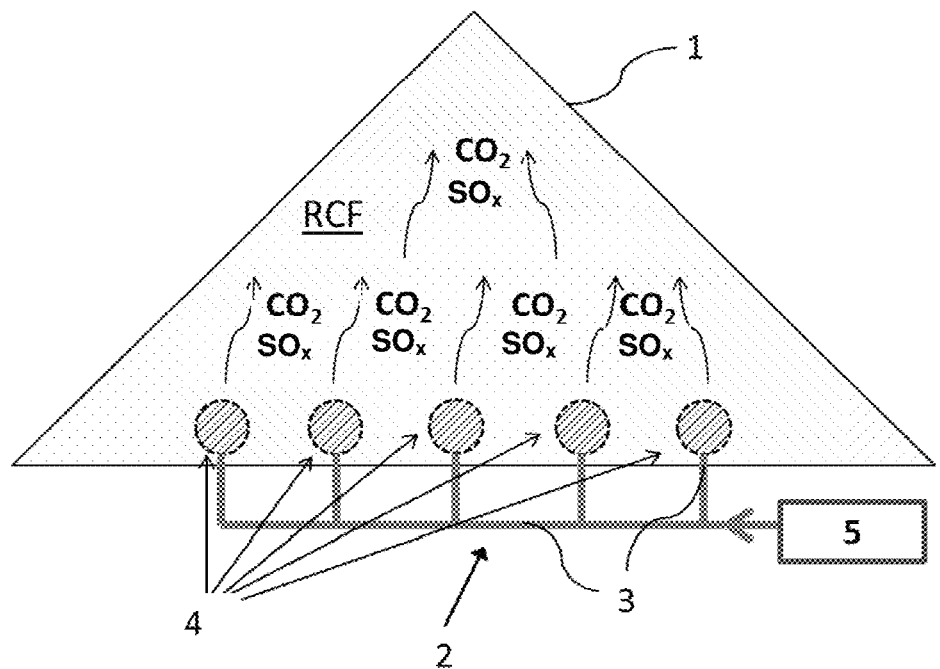

In FIG. 4 the recycled concrete fines are stockpiled, optionally after a mechanical pretreatment. The stockpile 1 comprises a gas introduction system 2 comprising conduits 3 and gas distributors 4. Exhaust gas 5 is passed into the conduits 3 and discharged into the stockpile 1 by the distributors 4. The conduits 3 are arranged at the bottom of the stockpile 1. Exhaust gas 5 is introduced into the RCF by the distributors 4, which can be nozzles for example. The exhaust gas 5 flows in vertical direction with respect to the stockpile 1 thereby contacting contained $CO_2$ and/or $SO_x$ with the waste material. The RCF is carbonated and/or sulphurized by flushing the stockpile bed with the exhaust gases containing $CO_2$ and/or $SO_x$.

Figure 5:
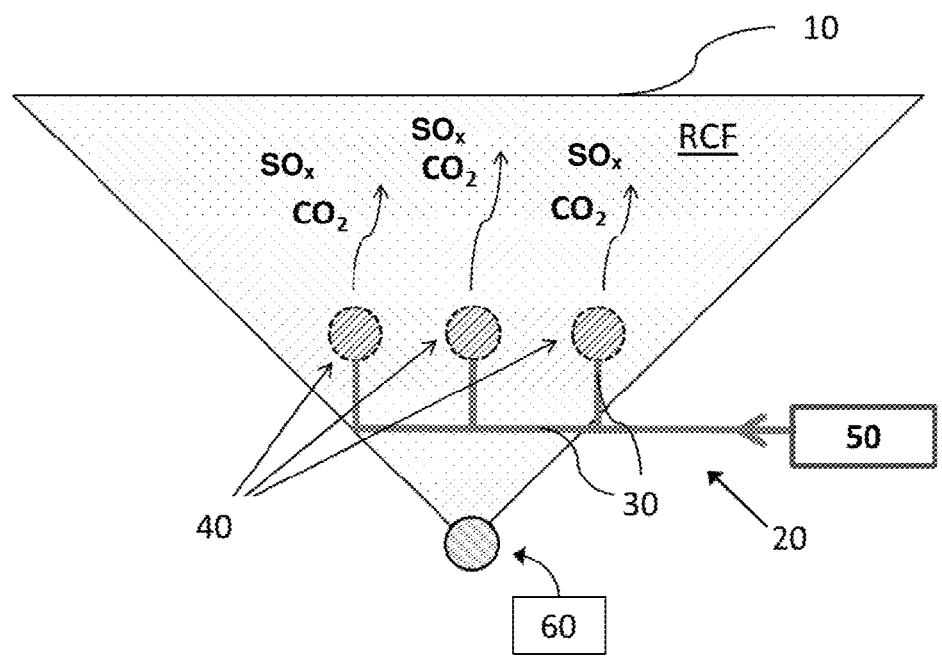

FIG. 5 schematically shows an embodiment of the method according to the invention, wherein the recycled concrete fines are placed into a silo 10, optionally after the pretreatment. Carbonation and/or sulphurization of the RCF is performed in the silo 10 by exhaust gas 50. This is provided by gas distribution system 20 through conduits 30 arranged at the bottom of the silo 10 and introduced through distributors 40. The exhaust gas 50 flows in vertical direction with respect to the silo 10. The starting material is carbonated and/or sulphurized by flushing the exhaust gas 50 through the starting material. The silo 10 can contain a bottom discharge outlet 60 for withdrawing the obtained carbonated/sulphurized RCF.

LIST OF REFERENCE NUMBERS

1 stockpile
2 gas introduction system
3 conduit 4 gas distributor
5 exhaust gas
RCF waste material
10 silo
20 gas introduction system
30 conduit
40 gas distributor
50 exhaust gas
60 carbonated RCF discharge
RCF waste material

What is claimed is:

1. A method for simultaneous cleaning of exhaust gas from $CO_2$ and manufacturing a supplementary cementitious material from recycled concrete fines, comprising the steps:
providing recycled concrete fines with $d_{90} \leq 1000$ µm in a stockpile or silo as starting material
flushing the starting material with the exhaust gas providing a carbonated material,
withdrawing the carbonated material and cleaned exhaust gas, and
de-agglomerating the carbonated material to form the supplementary cementitious material.

2. The method according to claim 1, wherein the recycled concrete fines are mixed with additional material to form the starting material.

3. The method according to claim 1, wherein the supplementary cementitious material has or is ground to a particle size distribution of $D_{90}$ below 90 µm (determined by laser granulometry) and a Rosin-Rammler slope n from 0.6 to 1.4.

4. The method according to claim 1, wherein carbonation is carried out until the supplementary cementitious material contains 1.25 times more $CO_2$ than the starting material.

5. The method according to claim 1, additionally comprising grinding of the starting material.

6. The method d according to claim 1, wherein the exhaust gas is additionally cleaned of $SO_x$ with x from 0 to 3.

7. The method according to claim 1, wherein the exhaust gas is at a temperature from 10 to 150° C. and at ambient pressure or at 0.01 to 4 bar overpressure.

8. The method according to claim 1, wherein exhaust gas from a cement plant, a coal fired power plant or from waste incineration is cleaned.

9. The method according to claim 1, wherein the exhaust gas is treated to increase a concentration of contained $CO_2$ and/or $SO_x$, with x from 0 to 3.

10. The method according to claim 1, wherein sulphur is removed from or diminished in the exhaust gas prior to flushing the starting material with the exhaust gas.

11. The method according to claim 1, wherein the exhaust gas is introduced at a bottom of the stockpile or silo and flows through the starting material in vertical direction.

12. The method according to claim 1, wherein the cleaned exhaust gas is further subjected to one or more of:
dust removal,
gas cooling,
gas conditioning,
heat recovery,
and/or used for drying of wet materials.

13. The method according to claim 3, wherein carbonation is carried out until the supplementary cementitious material contains 1.75 times more $CO_2$ than the starting material.

14. The method according to claim 2, additionally comprising grinding of the starting material.

15. The method according to claim 7, wherein exhaust gas from a cement plant, a coal fired power plant or from waste incineration is cleaned.

16. The method according to claim 3, wherein the cleaned exhaust gas is further subjected to one or more of:
dust removal,
gas cooling,
gas conditioning,
heat recovery,
and/or used for drying of wet materials.

17. The method according to claim 4, wherein the exhaust gas is at a temperature from 20 to 100° C. and at ambient pressure or at 0.1 to 2 bar overpressure.

18. The method according to claim 4, wherein exhaust gas from a cement plant, a coal fired power plant or from waste incineration is cleaned and the exhaust gas is at a temperature from 10 to 150° C. and at ambient pressure or at 0.01 to 4 bar overpressure.

19. The method according to claim 18, wherein the cleaned exhaust gas is further subjected to one or more of:
dust removal,
gas cooling,
gas conditioning,
heat recovery,
and/or used for drying of wet materials.

20. The method according to claim 8, wherein the exhaust gas is treated to increase a concentration of contained $CO_2$ and/or $SO_x$ with x from 0 to 3.

* * * * *